US010640924B2

(12) United States Patent
Mansikkasalo

(10) Patent No.: US 10,640,924 B2
(45) Date of Patent: May 5, 2020

(54) SYSTEM OF THERMAL RECOVERY RELATING TO THE OPERATION OF A DISSOLVER OF A CHEMICAL RECOVERY BOILER

(71) Applicant: Valmet Technologies Oy, Espoo (FI)

(72) Inventor: Jarmo Mansikkasalo, Pirkkala (FI)

(73) Assignee: Valmet Technologies Oy, Espoo (FI)

( * ) Notice: Subject to any disclaimer, the term of this patent is extended or adjusted under 35 U.S.C. 154(b) by 0 days.

(21) Appl. No.: 16/660,499

(22) Filed: Oct. 22, 2019

(65) Prior Publication Data

US 2020/0048832 A1   Feb. 13, 2020

Related U.S. Application Data

(62) Division of application No. 15/837,486, filed on Dec. 11, 2017, now Pat. No. 10,487,449.

(30) Foreign Application Priority Data

Jan. 20, 2017   (FI) ..................................... 20175048

(51) Int. Cl.
*D21C 11/00*   (2006.01)
*D21C 11/12*   (2006.01)

(52) U.S. Cl.
CPC .......... *D21C 11/0064* (2013.01); *D21C 11/12* (2013.01); *D21C 11/122* (2013.01); *Y02P 70/24* (2015.11)

(58) Field of Classification Search
CPC ....... Y02P 70/24; D21C 11/12; D21C 11/122; D21C 11/0064; D21F 5/20
See application file for complete search history.

(56) References Cited

U.S. PATENT DOCUMENTS

| 2,552,183 A | 5/1951 | Knight |
| 3,258,391 A | 6/1966 | Cornell et al. |
| 4,138,312 A | 2/1979 | Gill et al. |
| 4,526,760 A | 7/1985 | Empie, Jr. |

(Continued)

FOREIGN PATENT DOCUMENTS

| EP | 1193341 A1 | 4/2002 |
| FI | 122837 B | 7/2012 |
| WO | WO 97/22752 A1 | 6/1997 |

OTHER PUBLICATIONS

U.S. Appl. No. 15/837,486, filed Dec. 11, 2017, 2018/0209095, Allowed.

(Continued)

*Primary Examiner* — Anthony Calandra
*Assistant Examiner* — Elisa Vera
(74) *Attorney, Agent, or Firm* — Alston & Bird LLP

(57) ABSTRACT

The disclosed solution relates to recovering thermal energy from the operation of a dissolver of a chemical recovery boiler used in pulp manufacturing. According to the solution, a primary fluid circuit conveys green liquor from the dissolver to an external process such as causticizing and solvent such as weak white liquor back to the dissolver, and from this circuit solvent is diverted into a secondary fluid passageway comprising a heat exchanger which cools the solvent by recovering heat from it and transfers the heat to a heat-consuming process. After heat recovery, solvent may be used for further processes before it is at least partly conveyed back to the dissolver.

6 Claims, 3 Drawing Sheets

(56) References Cited

U.S. PATENT DOCUMENTS 5,545,292 A    8/1996 Empie, Jr.

OTHER PUBLICATIONS

Swedish Patent and Registration Office, Notice of Allowance, including Search Report, for Application No. 1751444-9, dated Sep. 26, 2018, 24 pages, Sweden.
Finnish Patent and Registration Office, Office Action, including Search Report, for Application No. 20175048, dated Sep. 7, 2017, 6 pages, Finland.

SYSTEM OF THERMAL RECOVERY RELATING TO THE OPERATION OF A DISSOLVER OF A CHEMICAL RECOVERY BOILER

CROSS REFERENCE TO RELATED APPLICATIONS

This application is a divisional of U.S. patent application Ser. No. 15/837,486, filed on Dec. 11, 2017, which United States application claims priority to and the benefit of Finnish Patent Application No. 20175048, filed on Jan. 20, 2017; the contents of both of which as are hereby incorporated by reference in their entireties.

BACKGROUND

Related Field

The disclosed solution relates to a system recovering thermal energy from the operation of a dissolver of a chemical recovery boiler.

Description of Related Art

In pulp manufacturing, chemical recovery boilers are employed to recover chemicals from the manufacturing process to be reused in the process. The process in the chemical recovery boiler generates heat which is typically recovered and used to produce steam which is converted into electricity with steam turbines. The chemical recovery process yields smelt which has a temperature of about 700 to 900° C. The smelt is conveyed into a dissolver, where the smelt is dissolved in a solvent such as weak white liquor, resulting in green liquor.

Typically, green liquor is discharged from the dissolver and conveyed into a causticizing process. In the causticizing process, weak white liquor is recovered from the green liquor. Causticizing yields weak white liquor as one output, which usually is conveyed back into the dissolver. In addition, weak white liquor may be used to wash other components in the system comprising the dissolver, as well as in wet gas scrubbers such as a vent gas scrubber as the injected liquid.

The temperature of the solution in the dissolver is elevated by the thermal energy inherent in the smelt and by the chemical reactions taking place in the dissolver. The temperature of the solution in the dissolver consequently typically rises above its boiling point, yielding gases which need to be vented out from the dissolver. Such venting may cause health and safety hazard for the personnel operating the process and additionally may cause undesirable emissions and loss of energy.

A system related to the operation of a dissolver of a chemical recovery boiler is disclosed in EP 1193341 A1.

BRIEF SUMMARY

The disclosed solution comprises a heat exchanger for recovering thermal energy from weak white liquor which is diverted from a primary fluid circuit running between a dissolver and an external process such as causticizing, which takes green liquor as an input and yields weak white liquor back to the primary fluid circuit.

More specifically, the solution is a system for recovering heat from the operation of a dissolver of a chemical recovery boiler, the system comprising: a dissolver in which smelt is dissolved in weak white liquor to produce green liquor; a primary fluid circuit adapted for (i) conveying green liquor from the dissolver into an external process, and (ii) conveying weak white liquor from the external process to the dissolver; a secondary fluid passageway adapted for conveying part of the weak white liquor diverted from the primary fluid circuit into the dissolver; a valve arrangement connecting the primary fluid circuit to the secondary fluid passageway, the valve arrangement configured to controllably divert weak white liquor from the primary fluid circuit to the secondary fluid passageway; a heat exchanger in the secondary fluid passageway for recovering heat from and thereby cooling the weak white liquor diverted from the primary fluid circuit and running through the secondary fluid passageway; and devices for transferring the recovered heat from the heat exchanger to a heat-consuming process.

The primary fluid circuit comprises: a first fluid passageway configured to alternate between i. conveying green liquor from the dissolver into the external process and ii. conveying weak white liquor from the external process to the dissolver; and a second fluid passageway configured to alternate between i. conveying green liquor from the dissolver into the external process and ii. conveying weak white liquor from the external process to the dissolver; wherein in a first state of the primary fluid circuit the first fluid passageway is configured to convey green liquor from the dissolver into the external process while the second fluid passageway is conveying weak white liquor from the external process to the dissolver; wherein in a second state of the primary fluid circuit the second fluid passageway is configured to convey green liquor from the dissolver into the external process while the first fluid passageway is conveying weak white liquor from the external process to the dissolver; and wherein a valve arrangement is provided for connecting the primary fluid circuit to the secondary fluid passageway, the valve arrangement being configured to controllably divert weak white liquor from the primary fluid circuit to the secondary fluid passageway, the valve arrangement being further configured to alternate between i. diverting, in the second state, weak white liquor from the first fluid passageway of the primary fluid circuit to the secondary fluid passageway and ii. diverting, in the first state, weak white liquor from the second fluid passageway of the primary fluid circuit to the secondary fluid passageway.

According to an example the secondary fluid passageway is connected downstream from the heat exchanger to at least one process.

According to an example, the heat exchanger is installed in the system and fluid conveyance pathways are configured in such a manner that the primary fluid circuit from the dissolver to the external process and back can be run in either direction so that weak white liquor instead of green liquor is always running through the heat exchanger. Preferably, all the weak white liquor diverted from the primary fluid circuit runs through the heat exchanger. Preferably, the heat exchanger resides close to the dissolver instead of being installed in the external process.

Installing the heat exchanger in the system in such a manner that the primary fluid circuit can be run in either direction has the benefit of reducing fouling and risk of blocking of the heat exchanger because in no circumstances is green liquor, containing fouling substances in significantly higher amounts than weak white liquor, in contact with the heat exchanger. Running the primary fluid circuit with a periodically alternating fluid direction similarly has the benefit of alternatingly washing lines of the primary fluid circuit with weak white liquor instead of a particular line always conveying green liquor and being subject to fouling and even blockage. Thus, process interruptions because of and costs associated with removing blockages and/or cleaning can be reduced with the disclosed solution.

Installing the heat exchanger in the system in such a manner that preferably all the weak white liquor diverted from the primary fluid circuit runs through the heat exchanger has the benefit of increasing thermal recovery from the weak white liquor in comparison to arrangements in which only part of the weak white liquor diverted from the primary fluid circuit runs through the heat exchanger, such as if the heat exchanger was installed in an inlet line of a process, for example the inlet line of a vent gas scrubber. Such increased thermal recovery has the desired effect of increasing the cooling of the dissolver as well as increased availability of thermal energy for useful purposes such as heating a building, for example the chemical recovery boiler building. Such heating of a building with thermal energy recovered by the heat exchanger thusly arranged may enable replacing a more valuable or costly source of energy or enable it to be used in more valuable applications instead of being used to heat a building.

According to an example, the heat-consuming process is an air heating system of a chemical recovery boiler building.

In addition, in such a case in which the heat exchanger is installed in an outlet line of a process, for example the outlet line of a vent gas scrubber, the heat exchanger is fouled by particulates contained in the output weak white liquor led from the process, creating process disturbances and costs associated with cleaning the heat exchanger, which the disclosed solution has the benefit of reducing or avoiding.

The figures are not in scale or suggestive of the physical layout or the dimensions of system components.

DETAILED DESCRIPTION OF VARIOUS EMBODIMENTS

In the text, reference is made to the figures with the following numerals:

| | |
|---|---|
| 1 | Chemical recovery boiler |
| 2 | Dissolver |
| 3 | Vent gas scrubber |
| 4 | Vent duct |
| 5 | Valve |
| 6 to 8 | Pump |
| 9 | Heat exchanger |
| 10 to 11 | Valve |
| 12 | Agitator |
| 20 to 37 | Line |
| 40 | External process |
| 50 | Heat-consuming process |
| 60 | Control unit |

Figure 1:
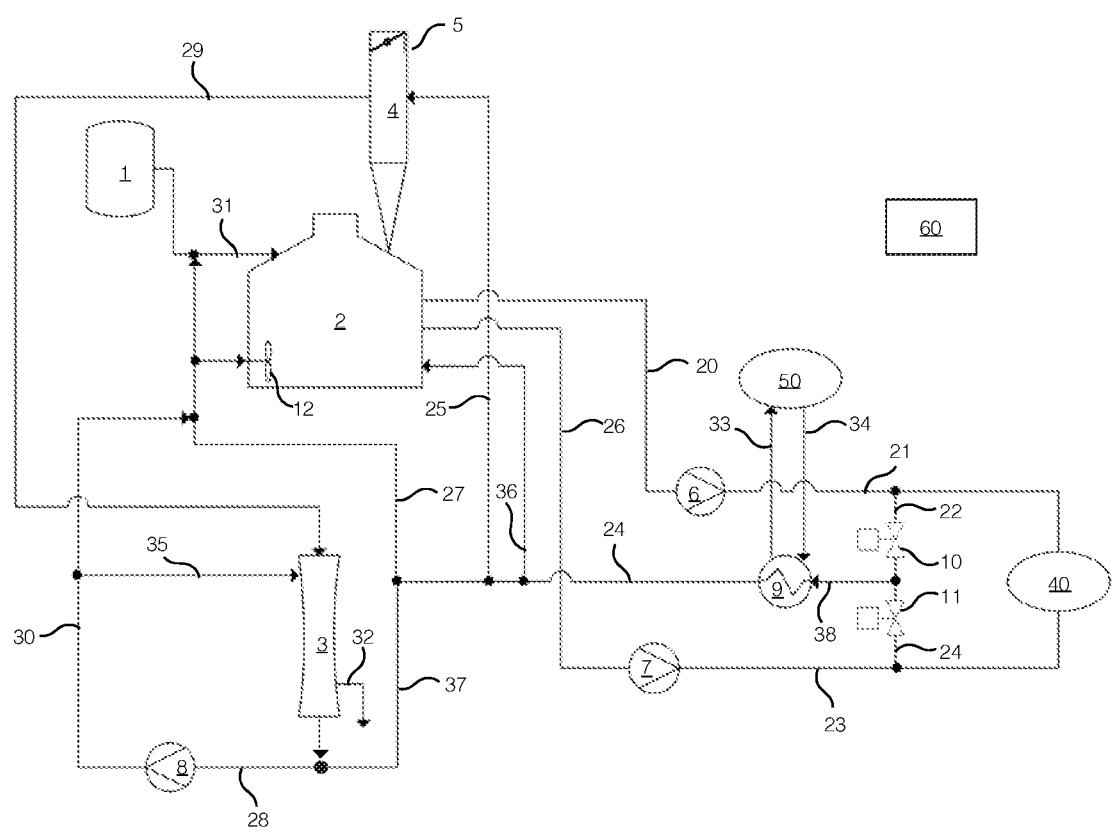
FIG. 1 illustrates diagrammatically the system relating to the operation of a dissolver of a chemical recovery boiler according to an example embodiment, the system comprising a heat exchanger adapted for recovering thermal energy from the process.

FIG. 1 schematically illustrates the operation of a system relating to the operation of a dissolver 2 of a chemical recovery boiler 1 according to an example. The chemical recovery boiler 1 feeds smelt via a smelt feed line 31 (i.e. a smelt spout) to the dissolver 2 in which green liquor is generated when the smelt is dissolved in process water such as weak white liquor. A solution-stirring agitator or agitators 12 stir the contents of the dissolver 2. An external process 40 such as causticizing recovers valuable substances from the green liquor, which process takes green liquor as input and yields weak white liquor as output back to the system. In the system, excess gases generated in the dissolver 2 are expelled through a vent duct 4 from the dissolver 2; and a vent gas scrubber 3 scrubs the expelled gases using weak white liquor as a scrubbing liquid.

In the disclosed solution, a heat exchanger 9 recovers thermal energy from weak white liquor circulating in the system.

Figure 2:
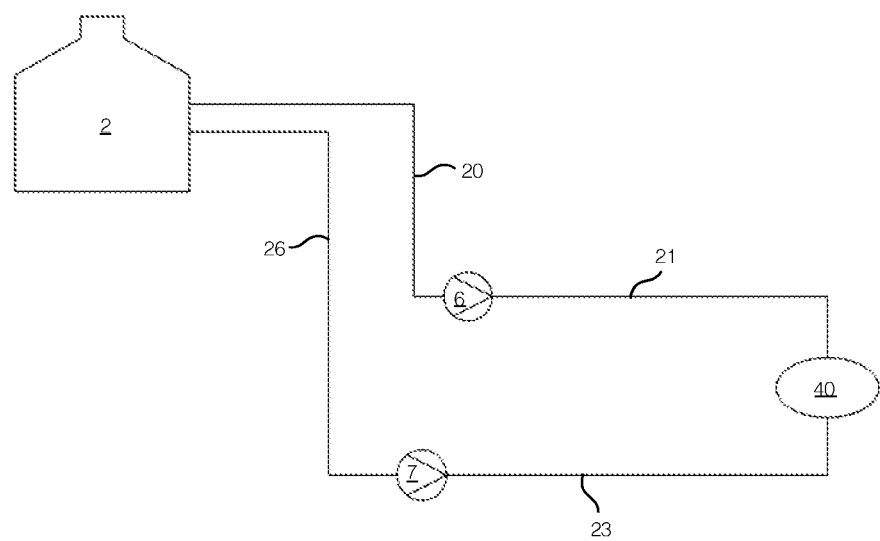
FIG. 2 illustrates diagrammatically a primary fluid circuit of the system of FIG. 1.

In the system of the disclosed solution, green liquor may be conveyed from the dissolver 2 to the external process 40 and weak white liquor may be conveyed from the external process 40 to the dissolver 2 through a primary fluid circuit. The primary fluid circuit between the dissolver 2 and the external process 40 is illustrated in FIG. 2 according to an example of the disclosed solution.

According to an example of the disclosed solution and FIG. 1, the primary fluid circuit may comprise two fluid conveyance pathways: a first fluid conveyance pathway and a second fluid conveyance pathway, both the said fluid conveyance pathways between the external process 40 and the dissolver 2. According to an example, as illustrated in FIG. 1 and FIG. 2, the first fluid conveyance pathway may comprise a line 20 originating at the dissolver 2 and a line 21 terminating at the external process 40; and the second fluid conveyance passageway may comprise a line 23 originating at the external process 40 and a line 26 terminating at the dissolver 2.

The first fluid conveyance pathway comprising the lines 20 and 21 may have a pump 6 for conveying fluids to which pump 6 the lines 20 and 21 may be connected. The second fluid conveyance pathway comprising the lines 23 and 26 may have a pump 7 for conveying fluids to which pump 7 the lines 23 and 26 may be connected.

According to an example of the disclosed solution and FIG. 1, the said primary fluid circuit may be run in either direction so as to reduce fouling of lines with substances contained in green liquor by alternately conveying weak white liquor in the first fluid conveyance pathway and the second fluid conveyance pathway.

Running the primary fluid circuit in either direction can be brought about so that, in a first state of the primary fluid circuit, green liquor is conveyed from the dissolver 2 to the external process 40 through the said first fluid conveyance pathway while weak white liquor is conveyed from the external process 40 to the dissolver 2 through the said second fluid conveyance pathway. Correspondingly, in a second state of the primary fluid circuit, green liquor is conveyed from the dissolver 2 to the external process 40 through the said second fluid conveyance pathway while weak white liquor is conveyed from the external process 40 to the dissolver 2 through the said first fluid conveyance pathway.

The primary fluid circuit is configured to controllably alternate between the first state and the second state. According to an example, the pumps 6, 7 may be configured so that a pump may be running in only one of the two said fluid conveyance pathways at any given time.

The disclosed solution may comprise a control unit 60 controlling the operation of the primary fluid circuit and its states and which may be used to control the running of the pumps 6, 7 and any related pumps, valves or valve arrangements in the primary fluid circuit and/or in the system of the disclosed solution.

Figure 3:
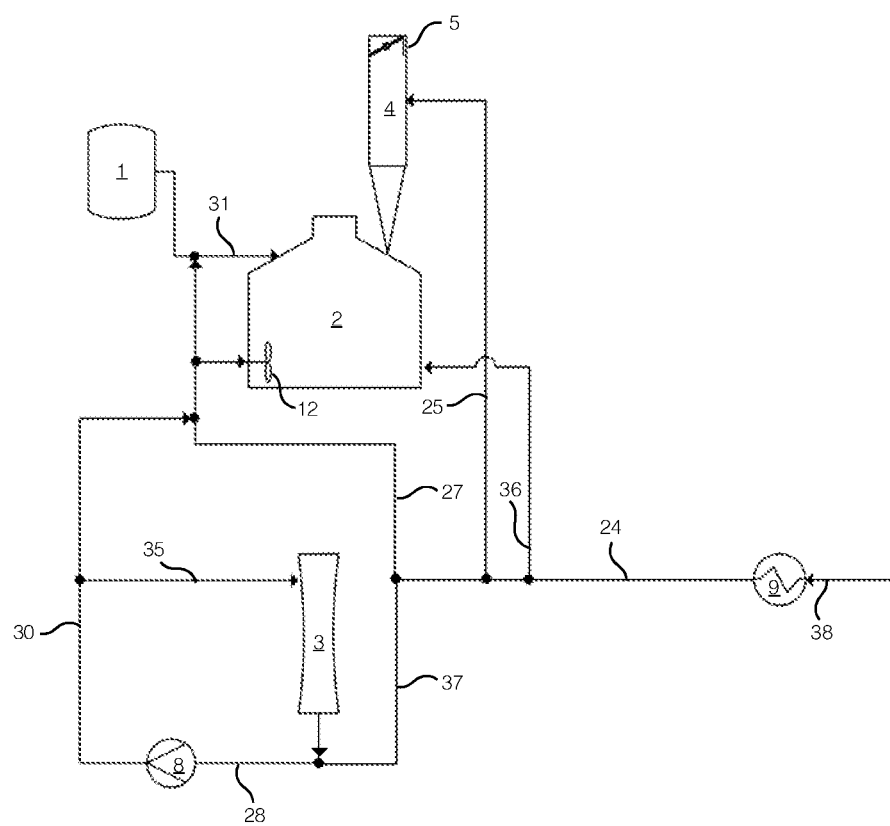
FIG. 3 illustrates diagrammatically a secondary fluid passageway of the system of FIG. 2.

According to the disclosed solution and FIG. 1, the primary fluid circuit between the dissolver 2 and the external process 40 may be connected to a secondary fluid passageway beginning with line 38. The lines comprised by the secondary fluid passageway, according to an example, are illustrated in FIG. 3.

Such a connection between the primary fluid circuit and the secondary fluid passageway may comprise a valve arrangement comprising, for example, two or more valves 10, 11. Such valves 10, 11 may be connected to the line 38 of the secondary fluid passageway. The valves 10, 11 may be connected with two or more lines 22, 24 to the primary fluid circuit. The said valve arrangement may be configured to controllably, such as controlled by the control unit 60, divert weak white liquor from the primary fluid circuit to the secondary fluid passageway.

The secondary fluid passageway may be used to divert weak white liquor from the primary fluid circuit so that part of the diverted weak white liquor can be utilized elsewhere in a process of the system such as for washing the vent duct 4, washing the smelt feed line 31, washing the agitator or agitators 12, and/or using the weak white liquor as a scrubbing liquid in the vent gas scrubber 3. Weak white liquor from the process may be lead to the dissolver 2. Additionally, weak white liquor may be led directly to the dissolver 2 from the secondary fluid passageway via line 36 and not via any process of the system.

According to an example of the disclosed solution, the valve arrangement is configured, or the valves 10, 11 may be configured to be alternately opened, such that weak white liquor may be conveyed through the secondary fluid passageway regardless of the state of the primary circuit or the fluid circulation direction in the primary fluid circuit between the dissolver 2 and the external process 40.

In one embodiment, as illustrated in FIG. 1, such synchronization as mentioned above may be effected under the control of the control unit 60 so that if pump 6 is driven, valve 10 is closed and valve 11 is open; and correspondingly if pump 7 is driven, valve 11 is closed and valve 10 is open. In another embodiment, it may additionally be possible to keep the valves 10, 11 closed regardless of which pump or pumps 6, 7, if any, is driven if no weak white liquor is desired to be conveyed from the primary fluid circuit to the secondary fluid passageway.

In the disclosed solution, the secondary fluid passageway, conveying weak white liquor to the dissolver 2, comprises the heat exchanger 9. In the disclosed solution, as illustrated in FIG. 1, weak white liquor diverted from the primary fluid circuit between the dissolver 2 and the external process 40 is conveyed through the heat exchanger 9 so that all thusly diverted weak white liquor may be subjected to heat recovery in the heat exchanger 9.

For conveying the recovered heat to a heat-consuming process 50, such as an air heating system of a building, for example a chemical recovery boiler building, there may be, a heat conveyance circuit connecting the heat exchanger 9 to the heat-consuming process 50. The air heating system may be adapted to heat air led into the building. Such a heat conveyance circuit may comprise one or more circulating heat transfer medium circuits known useful for heat transfer applications such as, for example, a water circuit, a glycol circuit, a water-glycol circuit or an oil circuit. The heat conveyance circuit may comprise a heat exchanger and/or lines 33, 34 for the heat transfer medium.

The varieties and using of heat exchangers are well known in the industry, and such knowledge readily applies to the heat exchanger 9.

Installing the heat exchanger 9 to the secondary fluid passageway so that weak white liquor may be conveyed through the heat exchanger 9 regardless of the state of the primary circuit or the fluid circulation direction in the primary fluid circuit between the dissolver 2 and the external process 40 has the benefit of the heat exchanger 9 not being fouled by substances contained in green liquor. Hence, such an arrangement may enable reducing or eliminating process disturbances and/or costs associated with cleaning green liquor residues from the heat exchanger 9 and lines to and from it.

Installing the heat exchanger 9 to the secondary fluid passageway so that preferably all the weak white liquor diverted from the primary fluid circuit may be conveyed through the heat exchanger 9 has the benefit of great thermal energy recovery from the process associated with the operation of the dissolver 2 and consequently economic operation of the process. Such a great thermal recovery may enable replacing an energy source, for example, for heating the building in which the said process is housed and/or another building or buildings. In a case in which such heating has been performed with thermal energy captured elsewhere in the process or another process, such as from the steam generated in conjunction with the chemical recovery boiler 1, installing the heat exchanger 9 to the secondary fluid passageway has the benefit of enabling the use of the captured thermal energy elsewhere in the process or in another process or in more useful or economic applications such as electricity generation. In a case in which such heating has been conducted by using energy such as electricity bought in the market, installing the heat exchanger 9 to the secondary fluid passageway so that preferably all weak white liquor diverted from the primary fluid circuit runs through the heat exchanger 9 has the benefit of replacing such costly market-sourced energy with surplus energy in the process associated with the operation of the dissolver 2.

Extracting heat from the process associated with the operation of the dissolver 2 with the heat exchanger 9 also has the benefit of reducing the thermal energy inherent in the process and thereby also lowering the temperature of the dissolver 2. Lower temperature of the dissolver 2 may reduce the creation of vent gases in the dissolver 2.

In the disclosed solution, the secondary fluid passageway may convey the weak white liquor to useful applications in one or more processes in the system. Preferably, the one or more processes are connected to the secondary fluid passageway downstream from the heat exchanger 9 so that thermal energy is not lost in a process connected upstream from the heat exchanger 9, for example, in a process connected to the line 20.

As illustrated in FIG. 1, such applications may comprise processes of the system, for example, using weak white liquor as a scrubbing liquid in the vent gas scrubber 3, using weak white liquor to wash the vent duct 4 of the dissolver 2, to wash the smelt feed line 31 from the boiler 1 to the dissolver 2, and/or to wash the agitator or agitators 12.

Weak white liquor from the process of the system may be led to a point preferably downstream from the heat exchanger 9. The point may be located in the secondary fluid passageway or in a line connected to it.

According to an example of the disclosed solution and FIG. 1, the secondary fluid passageway may, after the heat exchanger 9, convey weak white liquor to the vent gas scrubber 3 via lines, 24, 37, 28, 30 and 35; and/or via lines 24 and 27 to the smelt feed line 31 and/or the agitator or agitators 12. Excess gases may be led from the vent duct 4 to the vent gas scrubber 3 via a line 29, which gases may after scrubbing be expelled from the vent gas scrubber 3 via line 32. Weak white liquor from the vent gas scrubber 3 may be led back to the secondary fluid passageway. The lines 28, 30 may be provided with a pump 8 for conveying fluids. Preferably, weak white liquor from the vent gas scrubber 3 may be led or the line 30 may be connected to a point downstream from the heat exchanger 9 to prevent fouling.

According to another example, the vent gas scrubber 3 may be located in the system such that weak white liquor is conveyed to the vent gas scrubber 3 from a point in the secondary fluid passageway upstream from the heat exchanger 9 such as from the line 38. In such a case, weak white liquor may be conveyed back from the vent gas scrubber 3 to the secondary fluid passageway to a point in the secondary fluid passageway downstream from the heat exchanger 9 such as the line 24.

The weak white liquor conveyance pathways terminating at the smelt feed line 31, the agitator agitators 12 and/or the vent duct 4 may also constitute weak white liquor inputs to the dissolver 2 which inputs to the dissolver 2 constitute the terminuses of the secondary fluid passageway.

The disclosed solution is not limited to the examples and embodiments presented above. Furthermore, these examples and embodiments should not be considered as limiting but they can be used in various combinations to provide desired results. More specifically, the disclosed solution is defined by the appended claims.

The invention claimed is:

1. A system for recovering heat from the operation of a dissolver of a chemical recovery boiler, the system comprising:
   the chemical recovery boiler;
   the dissolver in which smelt is dissolved in weak white liquor to produce green liquor;
   a smelt feed line via which smelt from the chemical recovery boiler is conveyed into the dissolver;
   a primary fluid circuit configured for:
   i. conveying green liquor from the dissolver into an external process, and
   ii. conveying weak white liquor from the external process to the dissolver;
   a secondary fluid passageway configured for conveying part of the weak white liquor diverted from the primary fluid circuit into the dissolver;
   a heat exchanger in the secondary fluid passageway for recovering heat from and thereby cooling the weak white liquor diverted from the primary fluid circuit and running through the secondary fluid passageway; and
   devices for transferring recovered heat from the heat exchanger to a heat consuming process, wherein:
   the primary fluid circuit comprises:
      a first fluid passageway configured to alternate between i. conveying green liquor from the dissolver into the external process and ii. conveying weak white liquor from the external process to the dissolver; and
      a second fluid passageway configured to alternate between i. conveying green liquor from the dissolver into the external process and ii. conveying weak white liquor from the external process to the dissolver,
   in a first state of the primary fluid circuit the first fluid passageway is configured to convey green liquor from the dissolver into the external process while the second fluid passageway is conveying weak white liquor from the external process to the dissolver,
   in a second state of the primary fluid circuit the second fluid passageway is configured to convey green liquor from the dissolver into the external process while the first fluid passageway is conveying weak white liquor from the external process to the dissolver, and
   a valve arrangement is provided for connecting the primary fluid circuit to the secondary fluid passageway, the valve arrangement being configured to controllably divert weak white liquor from the primary fluid circuit to the secondary fluid passageway, the valve arrangement being further configured to alternate between i. diverting, in the second state, weak white liquor from the first fluid passageway of the primary fluid circuit to the secondary fluid passageway and ii. diverting, in the first state, weak white liquor from the second fluid passageway of the primary fluid circuit to the secondary fluid passageway.

2. The system according to claim 1, wherein the secondary fluid passageway is connected downstream from the heat exchanger to at least one of the following processes:
   the dissolver;
   a vent duct through which excess gases are expelled from the dissolver;
   a solution-stirring agitator or agitators of the dissolver; and
   a vent gas scrubber configured to scrub excess gases expelled from the dissolver.

3. The system according to claim 1, wherein the heat-consuming process is an air heating system of a chemical recovery boiler building.

4. The system according to claim 1, wherein the external process is causticizing.

5. The system according to claim 3, wherein:
   the heat exchanger is configured to transfer heat to a circulating heat transfer medium circuit, and
   the air heating system of the chemical recovery boiler building is configured to use heat of the circulating heat transfer medium circuit to heat the air of the chemical recovery boiler building.

6. The system according to claim 1, wherein the dissolver is connected downstream from the heat exchanger.

* * * * *